United States Patent [19]

Maloney

[11] Patent Number: 4,545,364
[45] Date of Patent: Oct. 8, 1985

[54] SOLAR HEATING MODULE

[75] Inventor: Timothy J. Maloney, Mountain Falls, Va.

[73] Assignee: One Design, Inc., Winchester, Va.

[21] Appl. No.: 451,411

[22] Filed: Dec. 20, 1982

[51] Int. Cl.$^4$ .............................................. F24J 3/02
[52] U.S. Cl. .................................. 126/430; 126/434; 126/437; 126/450; 220/72; 215/1 C
[58] Field of Search ................... 220/72; 215/1 C; 126/430, 417, 437, 434, 450

[56] References Cited

U.S. PATENT DOCUMENTS

| | | | |
|---|---|---|---|
| 2,595,905 | 5/1952 | Telkes | 126/270 |
| 3,563,305 | 2/1971 | Hay | 165/2 |
| 3,990,635 | 11/1976 | Restle et al. | 237/1 A |
| 4,050,508 | 9/1977 | Buckley | 165/32 |
| 4,121,565 | 10/1978 | Grisbrook | 126/422 |
| 4,137,964 | 2/1979 | Buckley | 165/1 |
| 4,149,589 | 4/1979 | Hopman | 165/32 |
| 4,158,686 | 6/1979 | Boeckmann | 264/45 |
| 4,162,671 | 7/1979 | Christy | 126/400 |
| 4,173,969 | 11/1979 | Scholl | 126/417 |
| 4,227,939 | 10/1980 | Zewail et al. | 136/247 |
| 4,243,022 | 1/1981 | Pedone | 126/449 |
| 4,245,617 | 1/1981 | Buckley | 126/434 |
| 4,257,477 | 3/1981 | Maloney | 165/48 |
| 4,263,765 | 4/1981 | Maloney | 52/562 |
| 4,274,548 | 6/1981 | Schneider | 220/72 |
| 4,280,483 | 7/1981 | Schaffer | 126/433 |
| 4,290,416 | 9/1981 | Maloney | 126/430 |
| 4,294,229 | 10/1981 | Maloney | 126/434 |

FOREIGN PATENT DOCUMENTS

| | | | |
|---|---|---|---|
| 2732881 | 2/1979 | Fed. Rep. of Germany | 220/72 |
| 2040436 | 8/1980 | United Kingdom | 126/437 |
| 2070231 | 9/1981 | United Kingdom | 126/437 |

OTHER PUBLICATIONS

"Report on Tests of a Passive Phase Change Solar Diode for Space Heating", Progress in Solar Energy, by American Section of the International Solar Energy Society, Inc. (1982), pp. 803-808.

Solar Energy Handbook, Edward Moran, "Solar Battery for Passive Heating".

"The Best in Solar", James A. Dawson, Aug. 1, 1981, Published by Dawson Energy Systems, Edinburg, Va. 22824-0326.

Primary Examiner—Carroll B. Dority, Jr.
Attorney, Agent, or Firm—Finnegan, Henderson, Farabow, Garrett & Dunner

[57] ABSTRACT

A combination solar collector, thermal storage and heating module for mounting in a building framework comprising a hollow panel member for receiving a thermal storage mass, including an outer wall and an inner wall; opposed pairs of sidewalls and end walls sealed to the inner and outer walls for connecting the corresponding perimeters of the inner and outer walls, thereby defining an enclosed chamber; a plurality of individual connections each of the connections forming a joint between the inner wall and the outer wall for maintaining the rigidity of the walls when the chamber is filled with the mass; and a port in the panel member for filling the panel member with the mass. Various modifications and alternatives are disclosed including several structures for attaching the module to the building framework, and additional modifications for increasing solar absorption and decreasing heat loss from the building.

21 Claims, 27 Drawing Figures

SOLAR HEATING MODULE

FIELD OF INVENTION

This invention relates to solar heating devices, and more specifically to a device for mounting in a framework of a building for collecting and storing heat from the sun, and dissipating that heat into the interior of the building. Such devices may also be utilized in reverse for cooling a building.

BACKGROUND OF THE INVENTION

Efforts have been underway for many years to develop improved apparatus and techniques for the passive heating and cooling of buildings and other structures. Passive solar heating and cooling generally involve a transfer of energy by radiation through a panel into a thermal mass or fluid. In heating applications, solar energy is normally stored in the thermal mass and is then radiated into a building or other structure for heating the interior thereof.

A large number of different solar heating devices have been developed in the prior art. Although earlier designs in solar heating devices generally required exterior mounting on the roof of a building or structure, more recent designs have placed emphasis on devices which can be installed directly in the walls of a building. However, such devices have not been readily accepted commercially by builders and other developers because of their high cost, the difficulty of incorporating such devices into standard housing plans, and the adverse visual and aesthetic impact on the overall house design perceived by the majority of home buyers.

Accordingly, it is a primary object of this invention to provide a solar heating module which is economical to manufacture and install.

It is a further object of this invention to provide a solar heating module which is readily adaptable to installation in buildings of standard design between building studs or rough wall openings, as is the practice with conventional windows.

Another object of the invention is to provide a prepackaged solar heating unit with glazing attached, which may be easily installed by a builder.

Another object of the invention is to provide a solar heating module which may be installed directly in the frame of a building without significantly modifying the aesthetic lines of the building.

An additional object of the invention is to provide a solar heating module which can be easily installed in a building frame, including a thermal mass storage member and the glazing sheet which may be separately attached or detached from the building frame.

Additional objects and advantages of the invention will be set forth in part in the description which follows, and in part will be obvious from the description, or may be learned by practice of the invention. The objects and advantages of the invention may be realized and obtained by means of the instrumentalities and combinations particularly pointed out in the appended claims.

SUMMARY OF THE INVENTION

To achieve the foregoing objects and in accordance with the purpose of the invention, as embodied and broadly described herein, the solar heating module of this invention comprises a hollow panel member for receiving a thermal storage mass, the panel member including an outer wall and an inner wall; wall joining means for connecting the corresponding perimeters of the inner and outer walls, thereby defining an enclosed chamber; tensile means between the inner and outer walls for maintaining the rigidity of the walls when the chamber is filled with the mass; and port means into the panel member for filling the panel member with the mass.

The tensile means may also serve the purpose of dividing the panel member into horizontal segments which limit separation of the thermal mass when it is a material subject to chemical separation, such as a phase change material, due to the small vertical cross-section of the segments.

Preferably, the tensile means includes a plurality of connections, each of the connections forming a joint between the inner wall and the outer wall. The connections preferably define a plurality of mutually opposed pairs of depressions in the walls, the opposed pairs being connected or seamlessly molded to form the joints. These depressions also may serve as female attachment sockets for anchoring shelving brackets or other fasteners.

It is also preferred that the wall joining means include opposing pairs of side walls and end walls sealed to the inner and outer walls. The inner and outer walls may be formed of translucent or transparent material, or may be opaque.

It is also preferred in some embodiments that vertical ribs be integrally molded into the outer surface of the panel member thereby presenting an undulating exterior surface. This undulating surface enhances solar absorption by increasing the overall surface area exposed to sunlight, and by providing a face with a portion perpendicular to incoming sunlight at all times of daylight.

Preferably, mounting means are provided for attaching the panel member into the frame of a building, and it is preferred that the panel members be oriented vertically and mounted between adjacent wall studs of the building, or added to the surface of interior walls which are in the line of sight of windows.

Preferably, the module is light transmitting, and the outer wall may also include a plurality of protrusions molded onto the external surface thereof for increasing solar absorption while still allowing for light transmission through the module.

The walls may also be tinted for increasing solar absorption by the module, and a decorative pattern may be integrally molded on, or attached to the surface of the inner wall of the module.

The inner and outer walls, the wall joining means, and the tensile means are preferably integrally formed of a molded thermo-plastic material. A translucent glazing panel may be included for covering the outer wall, and additional glazing layers and convection suppressing barriers may further be used to enhance system operation. The glazing panel and/or the panel member may be separately attachable and removable from the building frame.

The inner wall of the panel member may be covered with a decorative material such as a fabric of woven or open weave fibers, or a grass-type mat for reducing the flow of purchased back-up heat in the building into the module.

BRIEF DESCRIPTION OF THE DRAWINGS

The accompanying drawings which are incorporated in an constitute a part of this specification, illustrate one embodiment of the invention, and, together with a description, serve to explain the principles of the invention.

DESCRIPTION OF THE PREFERRED EMBODIMENTS

Reference will now be made in detail to the present preferred embodiments of the invention, examples of which are illustrated in the accompanying drawings.

As shown in FIGS. 1-4, the invention is a solar heating module for mounting in a framework of a building. The module comprises a hollow panel member for receiving a thermal storage mass including an outer wall and an inner wall; wall joining means for connecting the corresponding perimeters of the inner and outer walls, thereby defining an enclosed chamber; tensile means between the inner and outer walls for maintaining the rigidity of the walls when the chamber is filled with the mass; and port means into the panel member for filling the panel member with the mass.

As here embodied, the module includes a hollow panel member 10 which is preferably thin walled and integrally formed or unitary. The panel member 10 has a generally rectangular outline and has two opposite face walls 12 and 14. As here embodied, the wall joining means includes two opposite side walls 16 and 18 and two opposite end walls 20 and 22. When the module is vertically oriented, the end walls 20 and 22 constitute the top and bottom of the module, respectively. The panel member 10 may be formed of the same materials and by the same process as used to manufacture thermoplastic milk bottles, carboys, bulk olive jars, and the like. For example, the module may be blow-molded, vacuum thermoformed, slush casted, or rotationally molded. A typical wall thickness is 0.125 inches and typical overall dimensions are three feet, nine inches (3'9") tall; three feet, ten and one half inches (3'10½") wide; and seven inches (7") thick. The seven inch preferred thickness of the module corresponds to the amount of water mass necessary to achieve optimal thermal benefit from the module of this invention in much of the United States. If phase change material is used, the module may be as thin as one inch. The module is preferably integrally formed and is seamless.

Figures 5, 6, 7:
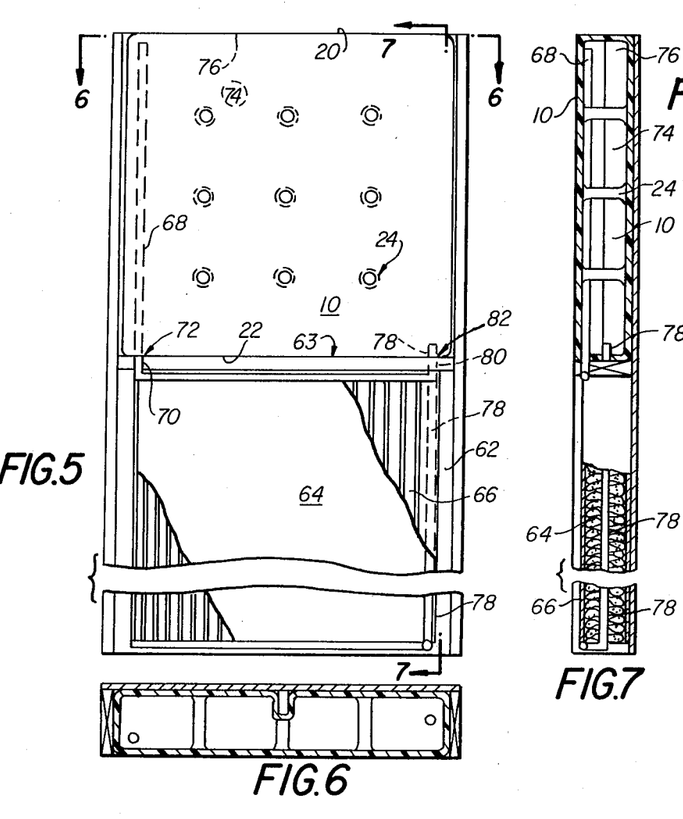
FIG. 5 is an outside elevational view of an alternative embodiment of the present invention with the outer panel of the building removed.
FIG. 6 is a horizontal sectional view taken along the line 6—6 of FIG. 5.
FIG. 7 is a vertical sectional view taken along the line 7—7 of FIG. 5.
Figure 8:
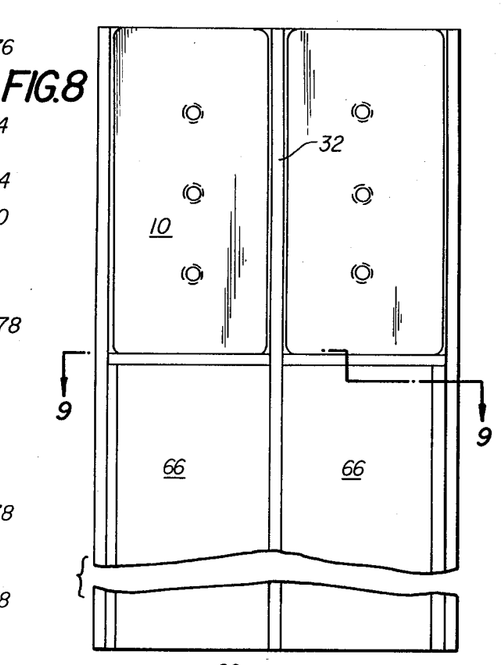
FIG. 8 is an inside elevational view of the embodiment of FIG. 5 with the inner panel of the building removed.
Figure 9:
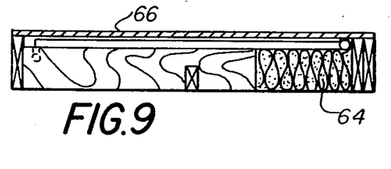
FIG. 9 is a horizontal sectional view taken along the line 9—9 of FIG. 8.

As here embodied, the tensile means comprises a plurality of connections 24 joining the inner and outer walls 12 and 14 of the panel member 10. Typically, the connections are arranged in a rectilinear pattern on approximately six inch centers, and each of the connections 24 forms a recess having a draft or taper, in the general shape of a cone. Typically, each recess is one inch (1") in diameter at its mouth tapering to one-half inch (½) in diameter at the center of the panel member. The connections 24 may be continuous, forming a hollow tubular recess completely through the panel member 10 as shown in FIG. 7, or they may be joined at a base 26. In addition, solid tubular members may be bonded into position between the walls, if desired.

The connections 24 prevent the inner and outer walls 12 and 14 of the panel member 10 from centrally ballooning away from one another when the module is filled with a thermal mass. Instead, the connections 24 form tensile structures which maintain the rigidity of the walls 12 and 14. In addition, these connections provide compressive strength to protect against collapse of the walls in the event of sub-atmospheric conditions in the panel member. These connections also provide a cavity into which wall fasteners may be secured to support attachments to the panel member.

Figures 1, 2:
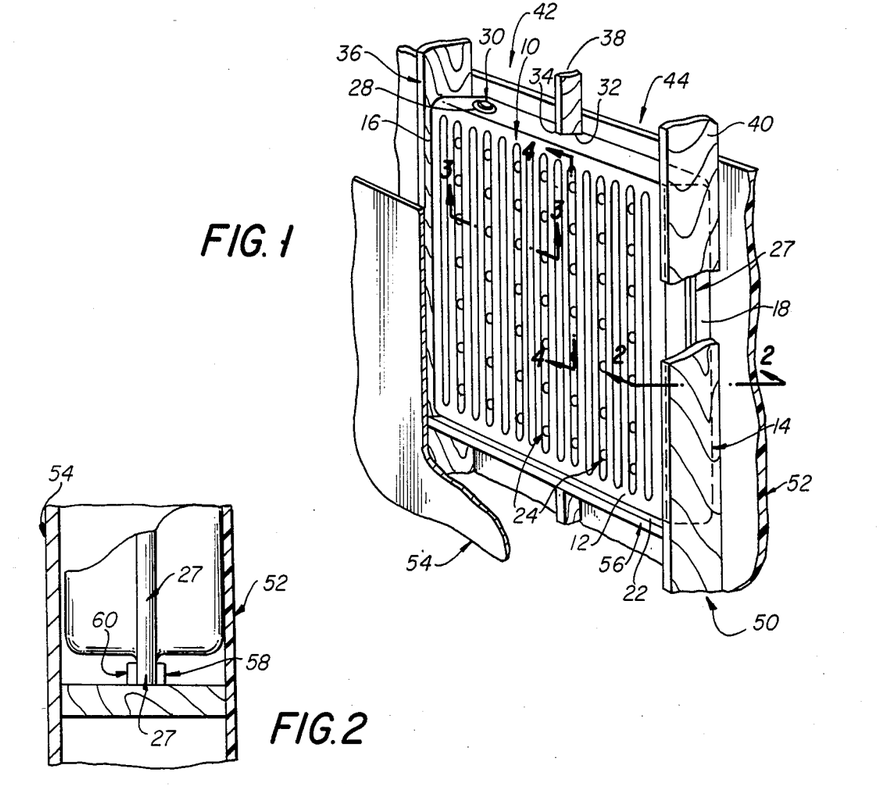
FIG. 1 is a perspective view of a solar heating module of the present invention.
FIG. 2 is a fragmentary horizontal sectional view taken along the line 2—2 of FIG. 1.
Figure 3:
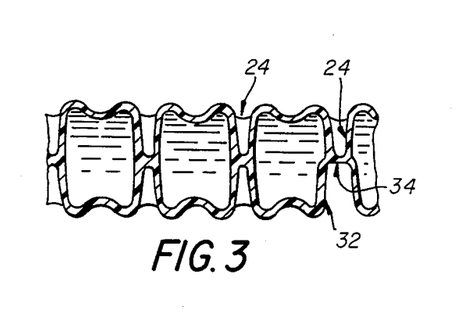
FIG. 3 is a fragmentary horizontal sectional view taken along the line 3—3 of FIG. 1.
Figure 4:
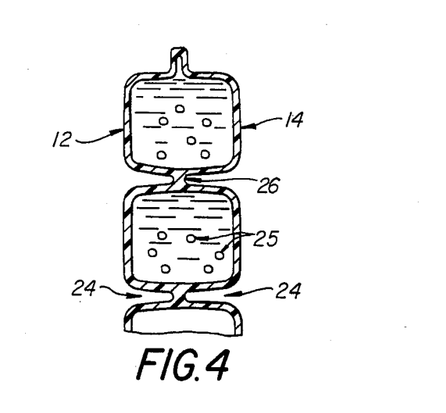
FIG. 4 is a fragmentary vertical sectional view taken along the line 4—4 of FIG. 1.

As embodied herein, the port means includes a filler valve 28 in the panel member 10 as shown in FIG. 1. A suitable cap 30 is provided for sealing the filler valve.

In accordance with the invention, the wall joining means includes rib means for expansion and contraction of the panel member in response to thermally induced changes in the volume of mass within the panel member. As here embodied, the rib means includes a pair of ribs 27, shown in FIG. 1 in the form of a flange extending outwardly from the side walls 16 and 18. Alternatively, the ribs may be isolated along a part of their length from the module interior. In this form, the ribs 27 may serve as nailing strips or as conduits for various purposes. The ribs 27 may be offset toward the inner wall 12 or the outer wall 14 instead of being located at the midline, as depicted in FIG. 1.

In the preferred form, the ribs 27 provide a unique solution to thermal expansion of the panel member 10, which goes through cycles of substantial temperature change on a daily basis. The inherent flexibility of the thermoplastic material which is typically utilized for construction of the panel member 10 allows for expansion of the panel member 10, particularly at the junction of the ribs 27 and side walls 16 and 18, and at the junction of the side walls 16 and 18 and the inner and outer walls 12 and 14. A combination of substantially right angles at these connections provides a bellows effect which permits the panel member 10 to expand and contract in response to the thermally induced changes in volume of the thermal mass. Even though the panel member 10 is firmly supported in a building frame, thermal expansion is permitted.

The bellows action described above becomes more important when the thermal mass in the panel member 20 is a phase change material. Such materials have a significant thermal expansion and contraction cycle on the order of ten percent. The bellows action safely permits simple installation of the panel member 10 while providing proper relief to constant and substantial changes in volume of the contained medium. This solves a principal problem of encapsulating conventional phase change material.

The ribs 27 may be hollow and separate from the main body of the panel member 10, thereby forming a tube adjacent to either side of the panel member. An example of integrally molded tubes extending from the bottom of the panel member to the top of the panel member is shown in FIG. 7 at 68. These tubes may include openings into the main body of contained mass at the top or at the bottom of the panel member 10, or in both locations. The tubes 78 can thus be incorporated in a thermosiphon arrangement, described hereinafter. Such an arrangement eliminates plumbing connections, piping and seals which would otherwise be required.

The ribs 27, or portions thereof may be formed as flat solids in lieu of tubes to act as nailing ears for mounting the panel member 10 to building's framework. This feature provides a simple means of attachment, which may be readily adapted to roof mounting. In such a configuration, the module may be modified for domestic water preheating by installing an internal heat exchanger which may be molded integrally as a tank within a tank. In this case the domestic water line is fitted with a heat exchanger formed within the module. The module acts as a sky-light, and functions as a domestic water preheater.

In FIG. 1, a building structure is depicted which includes a pair of two by eight walls studs 36, 40. The module 10 may be sized to fit entirely into the space between two adjacent studs or may protrude slightly beyond smaller studs such as two by fours. The overall thickness of the panel member 10 may be no greater than the comparable thickness dimension of the framing 36, 40 so that the wall 50 which incorporates the panel member 10 can be made to completely house it by fastening a panel of transparent or translucent glazing 52 to the outside of the wall 50. A panel of heat conducting material such as sheet rock, woven cane or cloth 54 may also be applied to the inside of the wall 50, by attachment to wall studs or to fasteners in the dual purpose tensile sockets. The inside of the wall 50 may be covered in whole or in part with a sheet of decorative material, such as a woven fabric for further suppressing convection. Alternatively, a soft fibrous material may be bonded to the inside of the wall 50.

To permit use of modules wider than conventional stud spacing, an intermediate stud may pass through an appropriate groove in the module. In such an arrangement, either the inner wall 12 or the outer wall 14 is provided with a vertical medial groove 32 extending completely across the panel member 10. The medial groove 32 extends approximately half way through the thickness of the panel member 10. Preferably, this groove 32 has a base 34 which forms the connections 24 with the opposite wall 12 or 14. The base 34 is typically two inches wide, or at least the actual finish width of a two by four stud.

The panel member 10 may be inserted into the space among three studs 36, 38 and 40, the flanking studs 36 and 40 being finished two by eights and/or two by fours and the intervening stud 38 being a two by three or two by four. The inner or outer edge of the intervening stud 38 may be flush with the corresponding edges of the studs 36 and 40. The panel member 10 straddles the stud 38 and occupies the stud space 42 between studs 36 and 38 and the stud space 44 between studs 38 and 40.

The vertical groove 32 functions similarly when the panel member is deployed horizontally in a ceiling or floor, or at any angle. The intermediate stud 38 may be constituted by a wooden member between two and one half inches and twelve inches in depth or may be a metal member of appropriate support dimension. The intermediate stud may be a roof rafter or floor joist, which may or may not extend beneath the surface of the panel member 10.

In addition, when the panel member 10 is deployed in a ceiling or beneath the ceiling, the intermediate stud 38 may be a steel channel which contains electrical wiring or a lighting fixture such as a fluorescent tube. The light fixture hides the steel channel and provides supplementary lighting as needed at night. The light fixture may be covered with an opaque or semi-opaque cover having a reflective backing to prevent the light source from appearing as a hot spot of light. Such a reflective backing also bounces the light to the left and right of the light source into the thermal mass, making the panel member 10 a diffused light source at night. The module admits natural day light when available, and artificial light when desired.

Thus, the solar heating module doubles as a night lighting source in this configuration. Small slots may be provided along the full length of both sides of groove 38 as a mounting means for the light reflecting cover and/or the light fixture.

Preferably, the panel member 10 is made half the height of the wall stud space in which it will be installed. The panel member 10 preferably occupies the space above a fire stop 56, or may be installed below a fire stop 56. Alternatively, two panel members 10 may be used, one above and one below a fire stop 56. A convenient mounting technique is illustrated in FIG. 1. A first slightly off-center stop 58 is attached to the studs 36 and 40. The panel member 10 is inserted into the stud space until it rests upon the fire stop 56. A second stop 60 is attached to the studs 36 and 40. The ribs 27 are trapped between the respective holding the module in vertical orientation so that it does not exert pressure on panels 52 and 54. Obviously, various other mounting techniques may be utilized.

For example, the stops 58, 60, or other suitable mounting means, may be used to secure respective strips into the frame where the module is to be mounted. Each of the mounting strips includes a groove for receiving one of the ribs 27 in close fitting relation. This method of installation permits removal of the panel member 10 without the need to substantially disassemble other sections of the wall or disturb panel members in adjoining stud spaces. U-shaped channels may also be utilized for this purpose.

The panel member 10 is filled with water or other thermal mass fluid and sealed. Where the inner or outer walls 12 and 14 are transparent or translucent, a conventional algecide may be added to the water, or to the plastic resin comprising the module.

The entire panel member is preferably formed integrally of a thermoplastic material or resin. The light transmission and radiation absorption characteristics of the panel member are regulated, in part, by the color of the resin used. A transparent resin offers the highest light transmission while an opaque resin offers the best ultraviolet protection and absorption. Variations between these two extremes may be utilized to provide different light transmission characteristics.

In FIGS. 5 through 9, an alternative embodiment is depicted. In this embodiment, a stud space 62 below the fire stop 63 is filled with a blanket of thermal insulation 64. A conventional freeze tolerant flat plate collector 66 is mounted on the exterior of the wall over the insulation blanket 64. A thermosiphon tube 68 extends upward through an opening 70 in the fire stop 63 through a circumferentially sealed opening 72 in the end wall 22 of panel member 10. The thermosiphon tube 68 terminates within the internal space 74 of panel member 10 near the opposite end wall 20.

As described previously, the use of a hollow cavity or pipe as the side rib 27 in FIG. 1 may serve as an alternative to the thermosiphon tube 68. A return line 78 extends from the lower end of the flat plate collector between the insulation and the adjacent stud through an opening 80 in fire stop 63 and into internal space 74 of the panel member 10. The return line 78 is sealed in an opening 82 of the panel member 10. The return line 78 terminates inside the panel member 10 near the end wall 22.

In this embodiment, the panel member 10 is mounted in the top half of a wall, while the bottom half is thermally insulated. The flat plate collector is disposed outside the thermal insulation on the outer surface of the wall. A glazing panel is mounted over both the flat plate collector and the panel member. Thus, both the collector and the panel member function as apertures for absorbing heat from the sun. Fluid in the collector plate moves upward and is stored in the panel member 10 for heat radiation into the building. However, heat loss is cut in half by the presence of the insulation between the flat plate collector and the interior of the building. In other words, the ratio of collection surface area to storage surface is two to one.

By mounting the storage mass above the flat plate collector, reverse thermosiphoning does not occur at night. This obviates the need for any complex control valves or other devices. The colder water in the bottom of the flat plate collector cannot rise to the storage tank.

In a further variation, the panel member 10 may be located behind one or two inches of light transmitting cellular insulating material such as expanded styrene or multi-layered film. In this arrangement, the flat plate collector covers the entire height of the wall and is made of light transmitting material such as acrylic plastic. In this configuration, the module provides some daylight while dramatically limiting night losses. The modules of FIGS. 1–9 may be filled with water, Glaubers' salt, or any other conventional phase change, thermal storage/re-radiation material. Where a phase change material is used in place of water, it may be preferred to use a thinner panel member, on the order of one inch thick instead of seven inches thick. The phase change material may also be encapsulated in a plurality of small containers 25 within the water filled panel 10 and the module may then be used as a two fluid thermal mass panel.

As is evident, the module of the present invention may be installed in a stud space on whichever side or side portions of a building are closest to the south. No special pre-planning or building orientation is necessary. This provides additional versatility, and is particularly useful in factory manufactured buildings where the ultimate orientation of the building is unknown at the time of manufacture.

Although the illustrated embodiments show conventional wooden studs, the modules may be used in the walls of buildings having truss-type studs, or open-web type construction.

Figure 10:
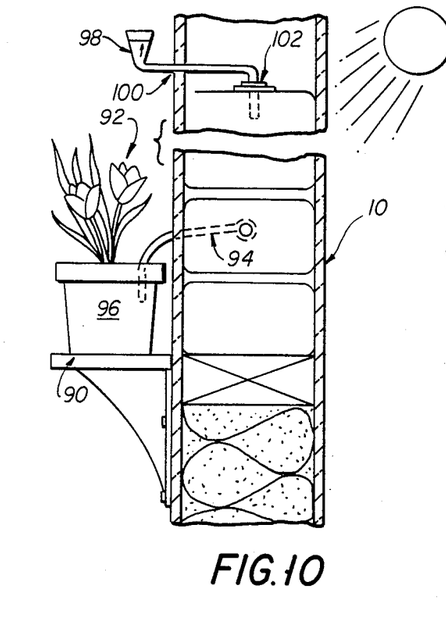
FIG. 10 is a fragmentary vertical sectional view showing a further embodiment of the present invention for use with botanical plants.

FIG. 10 shows an alternative embodiment where the inner and outer walls of the module 91, 93 are transparent or translucent, for providing daylight to the interior of the building. A shelf 90 may be hung on the interior wall 91 and plants 92 may be grown thereon. If desired, the water from within the panel member 10 may be treated with plant food, and a feed tube 94 may be provided for direct fluid communication with the plant root container 96. In this arrangement, the panel member 10 must be periodically refilled. A special funnel 98 may be mounted through an opening 100 in the interior wall of the building into the port 102 of the panel member 10.

Figure 11:
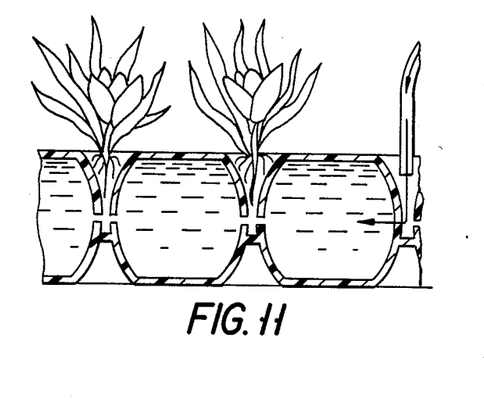
FIG. 11 is a fragmentary vertical sectional view showing a horizontally oriented module utilized as a hydroponic tank.

In a further embodiment shown in FIG. 11, the feed tube 94 may communicate with a horizontally disposed hydroponic tank 10'. A panel member 10' is shown in a horizontal orientation, with puncture 104 made into its upwardly opening recesses. The recesses become wells 106 in which plants 108 may be hydroponically grown. In this application, heat is radiated to the interior of the building from the panel member 10' after the panel member absorbs solar radiation through the south facing glass.

Figure 12:
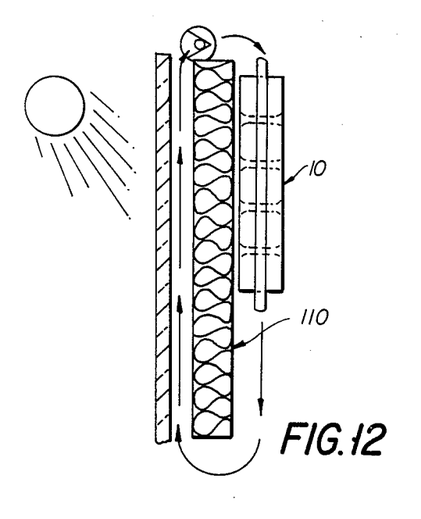
FIG. 12 is a schematic vertical sectional view of a wall having a module of the invention hung on the interior and connected in thermosiphoning relation with the intra-wall space around a panel of insulating material.

FIG. 12 depicts a further arrangement in which a panel member 10 is mounted adjacent an insulation panel 110 to provide an inner loop of a system as described in my U.S. Pat. No. 4,294,229, issued Oct. 13, 1981, which is incorporated herein by reference.

Figure 13:
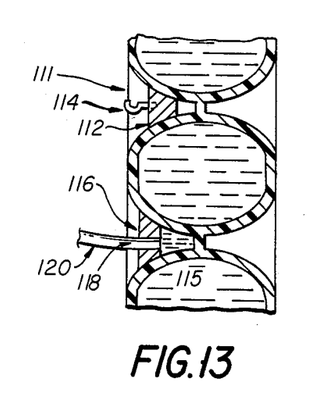
FIG. 13 is a schematic fragmentary sectional view of a variation of the invention in which plugs are fitted in respective recesses formed by the tensile means.

In FIG. 13, a recess 111 is shown fitted with a secured in place plug 112. In this arrangement, the plug 112 provides a fastener such as a hook 114 for mounting other objects from the inner wall of the module. For example, shelving, brackets, decorative panels, reflecting devices, glazing, frame pictures, and other household components may be fastened on the hook 114.

Alternatively, a plug 116 may be ported at 118 and secured in the recess 111. An opening 115 into the interior of the panel member provides for fluid flow through the plug port 118 and a conduit 120. In this arrangement, the fluid from the panel member may be utilized for temperature sensing, room humidification, fire safety, or any of the other uses depicted in FIGS. 10 and 11.

The solar absorption of a water-filled unit may also be increased by including the quantity of copper sulfate in the water. It is also possible to place an intermediate tinted plastic transparent film layer between the glazing sheet and the outer wall for increasing the solar absorption of the module. Additionally, the thermal storage mass itself may be tinted for enhancing solar absorption.

Figure 14:
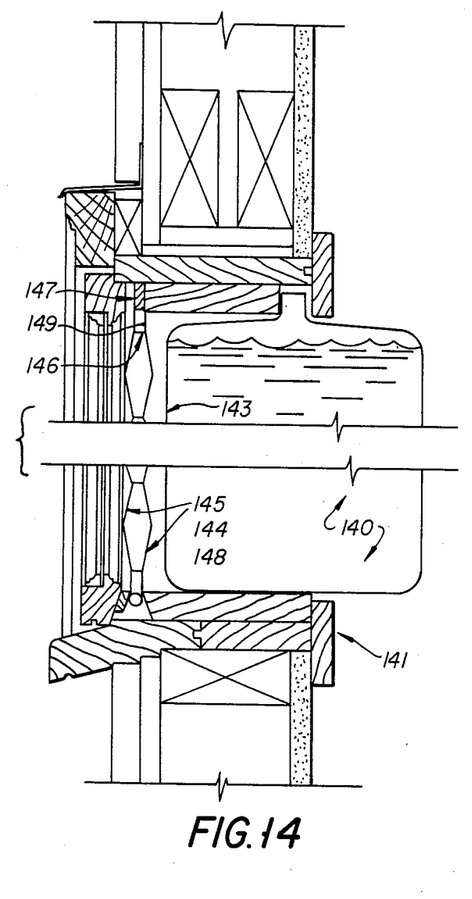
FIG. 14 is a cutaway view of a module of the present invention installed in a building framework which resembles a conventional window frame.

As shown in FIG. 14, the invention is readily adaptable to installation in a conventional window opening of a building. In FIG. 14, the panel member 140 is mounted within such a window opening on a sill 141. A glazing sheet 142 covers the outer wall 143 of the panel 140. The glazing sheet 142 is mounted at a distance from the outer wall 143 for defining an air space 144 between the outer wall and the glazing sheet. An intermediate transparent glazing layer 145 is disposed between the glazing sheet 142 and the outer wall 143 for reducing outward heat losses from the module. In the illustrated embodiment, a pair of transparent film layers is utilized, and a plurality of convection suppression barriers 146 are disposed between the transparent film layers 145. These transparent film layers 145 serve to reduce heat loss from the module, particularly during periods of darkness. The barriers reduce the convection currents between the layers, and result in enhanced reduction of heat loss from the system. The layers may be coated with an anti-reflective material, or a low emissivity coating if desired, for achieving varying effects on overall system performance.

In the embodiment shown in FIG. 14, the transparent film layers are pleated for folding in accordion relation. The top end of the transparent film layers 145 are attached to the window framework by a top attachment rod 147. A second attachment rod 148 holds the bottom end of the film layers to the lower portion of the window frame. If desired, the lower film attachment rod 148 may be unfastened and a mechanism 149 such as that used with a venetian blind may be provided for raising and lowering the transparent film layers for varying the insulating conditions in the building.

Figure 15:
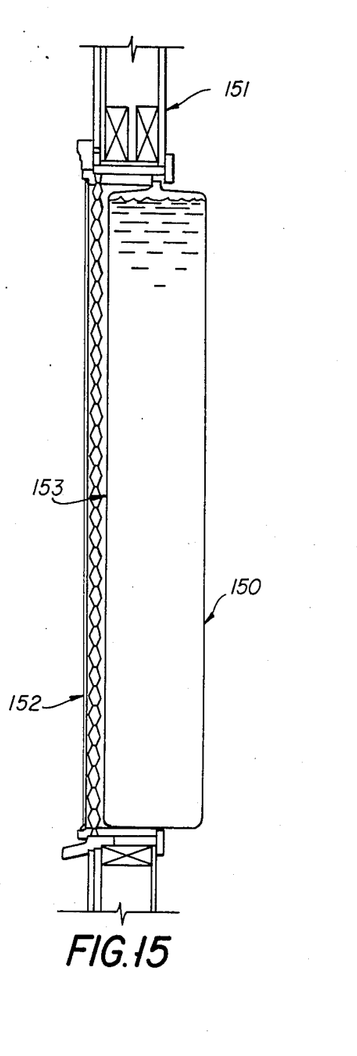
FIG. 15 is an end view of an embodiment similar to that of FIG. 14.

As shown in FIG. 15, the panel member fits readily into the space provided in a typical building wall. The inner wall of the panel member 150 extends only a short distance beyond the inner surface of the building wall 151. By using a phase change material as the thermal mass, a thinner panel member may be utilized which fits entirely within the width of a typical building wall. In the embodiment illustrated in FIG. 15, the module is mounted in an existing window opening of a building with a glazing panel 152 covering the outer wall 153 of the panel member. A mounting frame may also be molded in place around the perimeter of the module.

Figure 16:
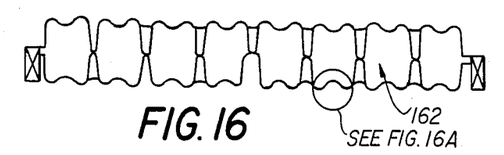
FIG. 16 is a top view of the module of the invention showing the tensile means.
Figures 16A, 16B, 17, 18:
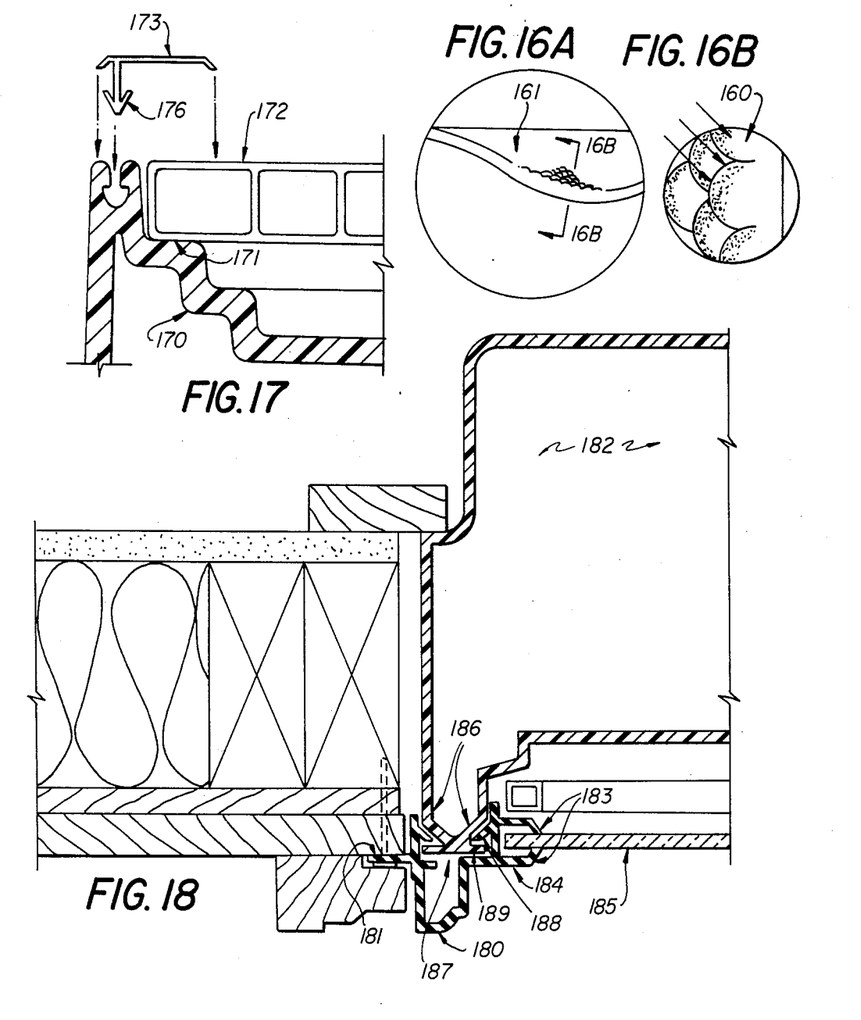
FIG. 16a is an enlarged view of the surface of the module of FIG. 16 showing the micro-protrusions thereon.
FIG. 16b is a further enlarged view of the surface of the module with the top portion of the micro-protrusions darkened for increasing solar absorption.
FIG. 17 is a partial top view of the module showing the integral molded step for supporting the glazing sheet, and the locking cap.
FIG. 18 is a vertical sectional view of an alternative embodiment in which the panel member and the glazing panel are both attached to a fastener.

In accordance with the invention, the external surface of the outer wall of the panel member may be provided with an anti-reflective coating means for increasing solar absorption and for transmitting light through the module. As embodied herein, and as best shown in FIGS. 16, 16a and 16b, the coating means includes a plurality of protrusions 160 molded onto the external surface 161 of the module 162. Each of the protrusions has a generally upward facing portion and a generally downward facing portion. The upward facing portions of the protrusions are darkened or blackened for enhancing solar absorption. The downward facing portions of the protrusions are translucent for transmitting light through the outer wall. The protrusions 160 may be hemispherical, or may be zig-zagged in shape.

Several alternative means are disclosed for supporting the glazing sheet on the module of the invention and for attaching the module to the framework of a building. As shown in FIG. 17, the module 170 may have a step 171 integrally molded thereon for supporting the glazing sheet 172. A corresponding locking cap 173 is provided for holding the glazing sheet 172 in place on the step 171. The locking cap 173 includes a pressure finger 174 and the module 170 includes a corresponding cavity 175 for receiving the finger 174 in snap-fit relation. It is preferred that the finger 174 include a pair of gripping barbs 176 for holding the finger 174 in the cavity 175. The locking cap 173 exerts pressure against the glazing sheet 172 for holding it in place against the step 171.

FIGS. 18, 19, 20, 21 and 22 all show alternative embodiments for attaching the module of the invention to the building framework. In FIG. 18, a bracket 180 including an integral flange 181 is utilized for attaching the module 182 to the building framework. In the illustrated embodiment, the flange 181 is provided with pre-drilled holes for receiving screws or nails. The bracket 180 also includes a pair of resilient gripping members 183 surrounding a slot 184 for receiving a glazing sheet 185 and holding it firmly in place. In this embodiment, the panel member 182 has a protrusion 186 on each side thereof. The protrusion 186 fits into an opening 187 on the bracket 180 and is locked in place against the bracket 180 by the action of a pair of resilient protrusions 188 on the bracket, and a pair of studs 189 on the panel member.

The module 182 may also include an offset portion 180 for supporting the module 182 against the building frame, and for reducing air infiltration around the module into the building. This offset portion 180 may abut against a framework member for aiding in the installation and alignment of the module.

Figure 19:
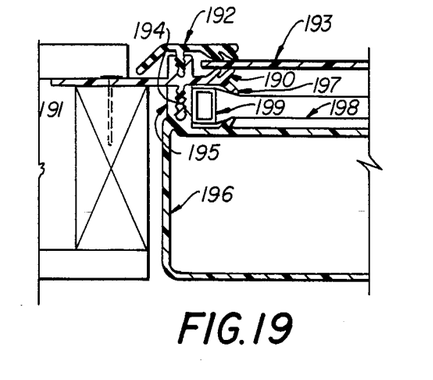
FIGS. 19, 20, 21 and 22 are all vertical sectional views each showing an alternative embodiment of the fastener.

A similar locking arrangement is shown in FIG. 19. In this embodiment, a fastener 190 also includes an integral flange 191 for attachment to the building framework. A separate locking cap 192 is provided for gripping and supporting the glazing sheet 193 between pairs of resilient fingers on the locking cap 192 and the fastener 190. As in the embodiment of FIG. 17, the locking cap 192 includes a pressure finger and the fastener 190 includes a corresponding cavity for receiving the finger in snap-fit relation. In addition, however, the fastener 190 includes a further resilient finger 194 and the panel member includes a corresponding cavity 195 for receiving the pressure finger 194 in snap-fit relation for attaching the panel member 196 to the fastener 190. In addition, the fastener 190 and the panel member 196 each include an integrally molded ridge 197 for securing and tightening a pair of transparent film layers 198. The film layers 198 are supported around the perimeter by a film frame 199. The film frame 199 is held in place by the fingers 197 when the panel member 196 is attached to the fastener 190. This attachment structure provides a simple and efficient means for mounting the module of the invention in a building, and for tightening the transparent film layers disposed between the outer wall of the panel member and the glazing sheet. In addition, it allows for easy removal of the glazing sheet without the necessity for removing the panel member, or vice versa.

Figure 20:
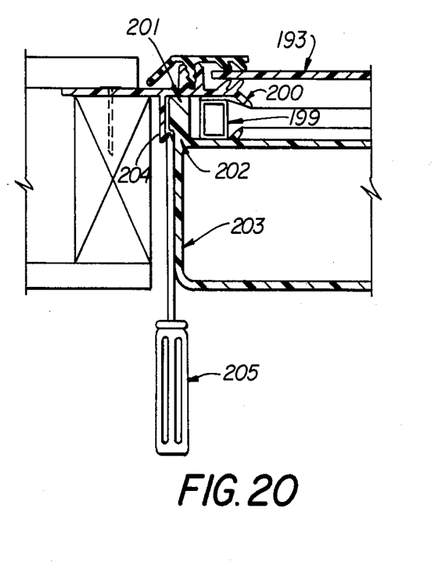

FIG. 20 illustrates an alternative fastening structure wherein the fastener 200 has an opening 201 for receiving a protrusion 202 on the panel member 203. A resilient finger 204 interacts with the protrusion 202 for locking the panel member 203 into position. This structure allows for easy removal of the panel member 203 by depressing the resilient finger 204 using a suitable tool 205.

Figure 21:
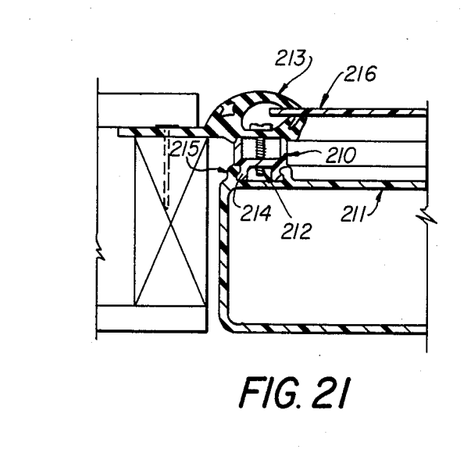

In the embodiment illustrated in FIG. 21, the fastener 210 is attached to the panel member 211 by means of an expandable locking arrangement. A bolt 212 extends through a bracket 213 and the fastener 210 causing a claw 214 to be displaced into locking relation with a corresponding claw 215 on the panel member 211. In this arrangement, the glazing sheet 216 is held in place by the bracket 213.

Figure 22:
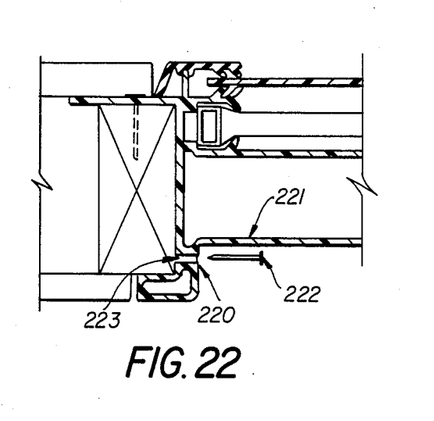

FIG. 22 shows a further alternative which includes a nailing extension 220 for attaching the module 221 to the building framework. The attachment is accomplished by the use of a fastener 222 which penetrates a molded-in-place plug 223. This allows leakproof fastener penetration, since the plug 223 is isolated from the thermal mass.

Figure 23:
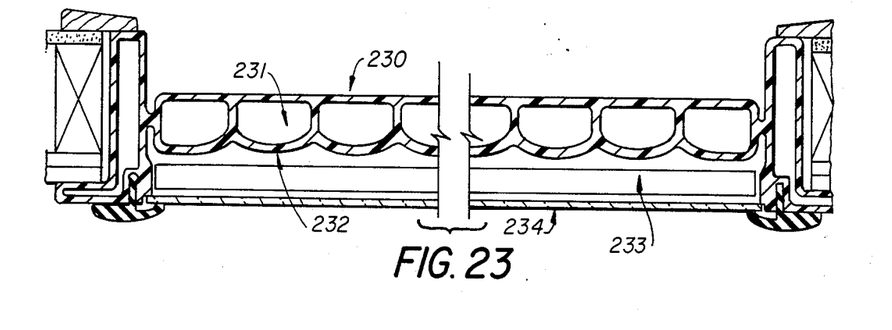
FIG. 23 is a vertical section of another embodiment of the invention wherein the module is divided into vertical tubes.
Figures 24, 25:
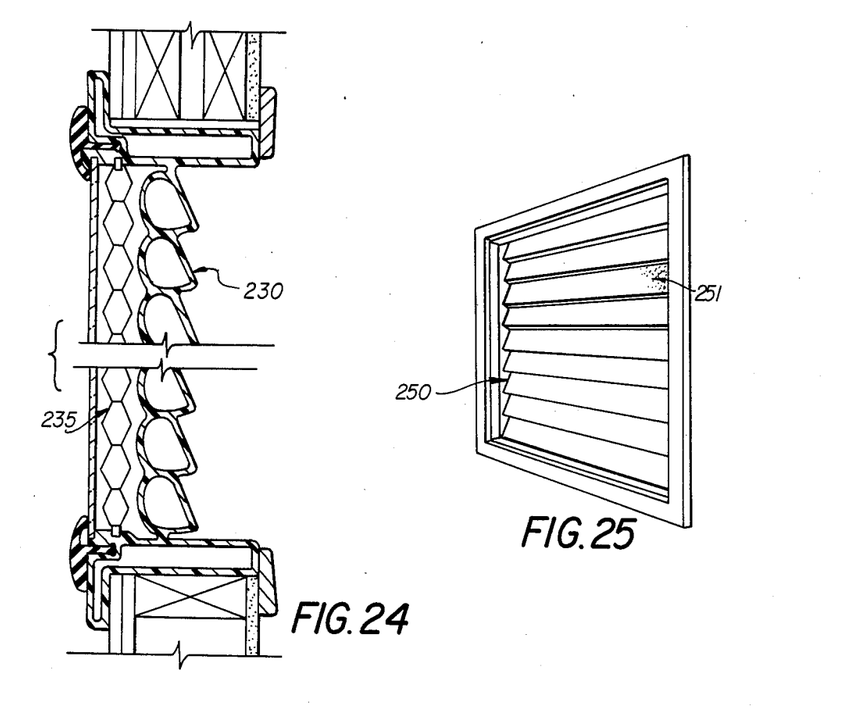
FIG. 24 is a vertical section of an embodiment similar to FIG. 23 including a transparent film layer between the panel member and the glazing.
FIG. 25 is a perspective view of a further embodiment of the invention in which the external surface of the module is molded in the appearance of a stair step configuration. In this configuration, the upward facing surfaces are relatively more sunlight absorbing, and the downward facing surfaces are relatively more light transmitting.

In the embodiments shown in FIGS. 23 and 24, the interior of the panel member 230 is divided into a plurality of chambers 231 which are joined for fluid communication therebetween. In this arrangement, the outer wall 232 of the panel member 230 has a rippled configuration and presents an increased surface area for solar absorption. In FIG. 23, an insulating layer 233 of one or more layers of film divided into convection suppression cells is disposed between the outer wall 232 and the glazing sheet 234. In FIG. 24, a pair of transparent film layers 235 are shown in the same relative position.

In FIG. 25, the outer wall 250 of the panel member is molded in the shape of a shutter. In this arrangement, the upward facing surfaces 251 of the shutter-like portions may be darkened for increasing solar absorption. In addition, the module presents the overall appearance of a shuttered window when installed in a window frame of a building. In this configuration, the lower or downward facing surfaces transmit daylight through the panel member into the interior of the building. The shutter-like portions may also be separated internally for limiting thermal separation of the mass, as mentioned above.

It will be apparent to those skilled in the art that various modifications and variations could be made in the invention without departing from the scope or spirit of the invention.

What is claimed is:

1. A combination solar collector, thermal storage and heating module for mounting in a building framework, comprising:

a hollow panel member for receiving a thermal storage mass, including an outer wall and an inner wall;

wall joining means for connecting the corresponding perimeters of said inner and outer walls, thereby defining an enclosed chamber, said panel member being sized for insertion between adjacent studs of a building;

tensile means between said inner and outer walls for maintaining the rigidity of said walls when said chamber is filled with said mass;

said tensile means including a plurality of individual connections, each defining mutually opposed pairs of depressions in said walls, the opposed pairs being connected and each said connection has a generally circular cross section through the length thereof;

port means into said panel member, for filling said panel member with said mass; and mounting means for attaching said panel member into the frame of a building;

said outer wall including external and internal surfaces, and said module also including anti-reflective coating means on the external surface of said outer wall, said coating means including a plurality of protrusions integrally molded on said external surface for increasing solar absorption and for transmitting light through said module.

2. The module of claim 1, wherein each of said protrusions has a generally upward facing portion and a generally downward facing portion, the upward facing portions of said protrusions being blackened for enhancing solar absorption, and the downward facing portions being translucent for transmitting light through said outer wall.

3. A combination solar collector, thermal storage and heating module for mounting in a building framework comprising:

a hollow panel member for receiving a thermal storage mass, including an outer wall and an inner wall;

wall joining means for connecting the corresponding perimeters of said inner and outer walls, thereby defining an enclosed chamber;

tensile means between said inner and outer walls for maintaining the rigidity of said walls when said chamber is filled with said mass; and port means into said panel member, for filling said panel member with said mass;

said building including a plurality of vertical wall studs in the walls thereof, said panel member being oriented vertically, and mounted between adjacent ones of said wall studs;

said building also including a plurality of intermediate studs, one of said intermediate studs being arranged between each adjacent pair of said wall studs, said panel member having a medial groove in one of the inner and outer walls thereof, and said groove being sized to fit over one of said intermediate studs when said panel is mounted between said adjacent studs.

4. A combination solar collector, thermal storage and heating module for mounting in a building framework, comprising:

a hollow panel member for receiving a thermal storage mass, including an outer wall and an inner wall;

wall joining means for connecting the corresponding perimeters of said inner and outer walls, thereby defining an enclosed chamber;

tensile means between said inner and outer walls for maintaining the rigidity of said walls when said chamber is filled with said mass; and port means into said panel member, for filling said panel member with said mass;

said thermal mass being a fluid and said module also including a flat plate solar collector mounted for exposure on the exterior of said building adjacent said panel member, and passage means for thermosiphoning fluid communication between said collector and said chamber.

5. The module of claim 4 also including insulation means disposed between the collector and the interior of said building.

6. The module of claim 5 wherein said module is dimensioned for mounting entirely within the space between adjacent wall studs of a building.

7. A combination solar collector, thermal storage and heating module for mounting in a building framework, comprising:

a hollow panel member for receiving a thermal storage mass, including an outer wall and an inner wall;

wall joining means for connecting the corresponding perimeters of said inner and outer walls, thereby defining an enclosed chamber, said panel member being sized for insertion between adjacent studs of a building;

tensile means between said inner and outer walls for maintaining the rigidity of said walls when said chamber is filled with said mass;

said tensile means including a plurality of individual connections, each defining mutually opposed pairs of depressions in said walls, the opposed pairs being connected and each said connection has a generally circular cross section throughout the length thereof;

port means into said panel member, for filling said panel member with said mass; and mounting means for attaching said panel member into the frame of a building;

said thermal mass comprising a plurality of small sealed containers, each containing a quantity of phase change material, said panel being filled with water, and said containers being disposed within said water-filled panel.

8. A combination solar collector, thermal storage and heating module for mounting in a building framework, comprising:

a hollow panel member for receiving a thermal storage mass, including an outer wall and an inner wall;

wall joining means for connecting the corresponding perimeters of said inner and outer walls, thereby defining an enclosed chamber;

tensile means between said inner and outer walls for maintaining the rigidity of said walls when said chamber is filled with said mass;

port means into said panel member, for filling said panel member with said mass;

mounting means for attaching said panel member into the frame of a building; and a sheet of translucent glazing covering at least a portion of said outer wall, and means for supporting said glazing sheet at a distance from said outer wall for defining an air space between said outer wall and said glazing sheet, said supporting means including a step integrally molded in said module for supporting said glazing sheet, and a corresponding locking cap for holding said glazing sheet in place on said step.

9. The module of claim 8 wherein said locking cap includes a pressure finger, and said module includes a corresponding cavity for receiving said finger in snap-fit relation.

10. The module of claim 9 wherein said finger includes a pair of gripping barbs for holding said finger in said cavity.

11. The module of claim 9 wherein said supporting means includes a bracket for gripping said glazing sheet, said bracket including an integral flange for attaching said module to said building.

12. The module of claim 8 wherein said locking cap includes a cavity therein and said module includes a corresponding finger for insertion into said cavity in snap-fit relation.

13. A combination solar collector, thermal storage and heating module for mounting in a building framework, comprising:

a hollow panel member for receiving a thermal storage mass, including an outer wall and an inner wall;

wall joining means for connecting the corresponding perimeters of said inner and outer walls, thereby defining an enclosed chamber;

tensile means between said inner and outer walls for maintaining the rigidity of said walls when said chamber is filled with said mass;

port means into said panel member, for filling said panel member with said mass;

mounting means for attaching said panel member into the frame of a building;

a sheet of translucent glazing covering at least a portion of said outer wall, and means for supporting said glazing sheet at a distance from said outer wall for defining an air space between said outer wall and said glazing sheet; and a pair of transparent glazing layers disposed between said glazing panel and said outer wall for reducing heat loss from said module;

including a plurality of convection suppression barriers disposed between said transparent glazing layers.

14. The module of claim 13 wherein said glazing layers include an anti-reflective coating.

15. The module of claim 13 wherein said glazing layers include a low-emissivity coating.

16. A combination solar collector, thermal storage and heating module for mounting in a building framework, comprising:

a hollow panel member for receiving a thermal storage mass, including an outer wall and an inner wall;

wall joining means for connecting the corresponding perimeters of said inner and outer walls, thereby defining an enclosed chamber;

tensile means between said inner and outer walls for maintaining the rigidity of said walls when said chamber is filled with said mass;

port means into said panel member, for filling said panel member with said mass;

mounting means for attaching said panel member into the frame of a building;

a sheet of translucent glazing covering at least a portion of said outer wall, and means for supporting said glazing sheet at a distance from said outer wall for defining an air space between said outer wall and said glazing sheet, said panel member being mounted within a window framework, said module also including a pair of transparent film layers having a plurality of convection suppression barriers disposed therebetween said layers being pleated for folding in accordian relation and including a first rigid element for attaching one end of said layers to the top of said windows framework, and a second rigid element for attaching the other end of said layers to the bottom of said window framework.

17. The module of claim 16 also including means for raising and lowering said pleated layers for varying the insulating conditions in said building.

18. A combination solar collector, thermal storage and heating module for mounting in a building framework, comprising:
   a hollow panel member for receiving a thermal storage mass, including an outer wall and an inner wall;
   wall joining means for connecting the corresponding perimeters of said inner and outer walls, thereby defining an enclosed chamber;
   tensile means between said inner and outer walls for maintaining the rigidity of said walls when said chamber is filled with said mass;
   port means into said panel member, for filling said panel member with said mass;
   mounting means for attaching said panel member into the frame of a building;
   a sheet of translucent glazing covering at least a portion of said outer wall, and means for supporting said glazing sheet at a distance from said outer wall for defining an air space between said outer wall and said glazing sheet;
   said supporting means including a fastener having a flange for attachment to said building framework, and a bracket for gripping said glazing sheet against said fastener.

19. The module of claim 18 wherein said fastener also includes means for attaching said panel member to said fastener.

20. The module of claim 18 wherein said panel member attaching means includes a groove in said fastener, and a corresponding locking extension on said panel member for insertion into said groove, said extension including a flexible arm for removably locking said panel member to said fastener.

21. The module of claim 19 also including a pair of film layers disposed between said outer wall and said glazing sheet, said fastener and said outer wall including corresponding ridges for securing said film layers, and for tightening said layers when said panel member is attached to said fastener.

* * * * *